United States Patent [19]

Sullivan

[11] 3,934,351

[45] Jan. 27, 1976

[54] FOLDABLE MEASURING STICK

[76] Inventor: John F. Sullivan, 14734 Lassen St., Mission Hills, Calif. 91345

[22] Filed: Sept. 16, 1974

[21] Appl. No.: 506,045

[52] U.S. Cl. .................................................. 33/105
[51] Int. Cl.² ............................................ G01B 3/06
[58] Field of Search ............. 33/105, 106, 161, 296; 403/84, 100, 102, 166

[56] References Cited
UNITED STATES PATENTS

| | | | |
|---|---|---|---|
| 469,592 | 2/1892 | Parkes | 403/100 |
| 774,365 | 11/1904 | Phenix | 33/105 X |
| 941,492 | 11/1909 | Burns | 33/105 X |
| 2,694,931 | 11/1954 | Handley | 403/112 X |
| 2,978,217 | 4/1961 | Gunderson | 403/59 X |

FOREIGN PATENTS OR APPLICATIONS

| | | | |
|---|---|---|---|
| 899,167 | 6/1962 | United Kingdom | 403/100 |

Primary Examiner—Harry N. Haroian
Attorney, Agent, or Firm—Jack C. Munro

[57] ABSTRACT

A first embodiment of foldable measuring stick which is composed of three separate members, the intermediate member having a hollow chamber, an elastic means located within said hollow chamber and interconnected on opposite ends to the other members, the interconnection with the elastic means to each member being through a pair of links which are pivotally connected together, the three members to be interconnected in an in-line position and useable as a measuring stick, the outer members being movable to a position along side the intermediate member when the stick is not in use, locking means for locking the outer members to the intermediate member when in the along side position. A second embodiment of measuring stick can be constructed of only two members with a stop block mounted within one member, a bifurcated rod element passing through the stop block, a coil spring surrounding one of the legs of the bifurcated element biasing the element to retracted position, the element pivotally connected to a link which is also pivotally connected to the other member.

4 Claims, 9 Drawing Figures

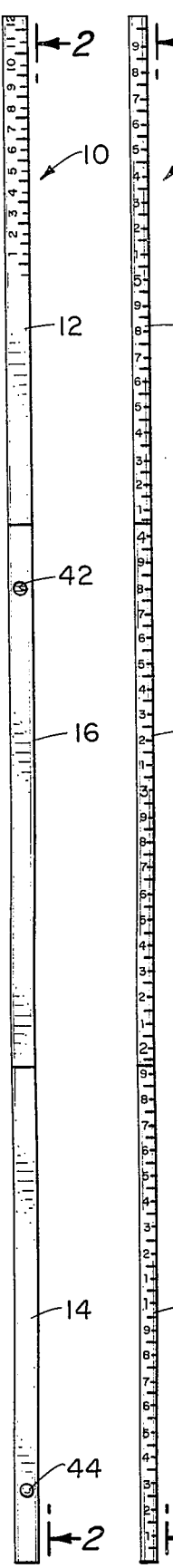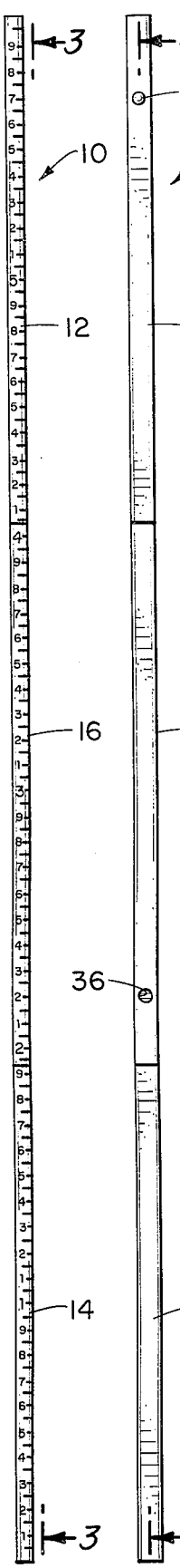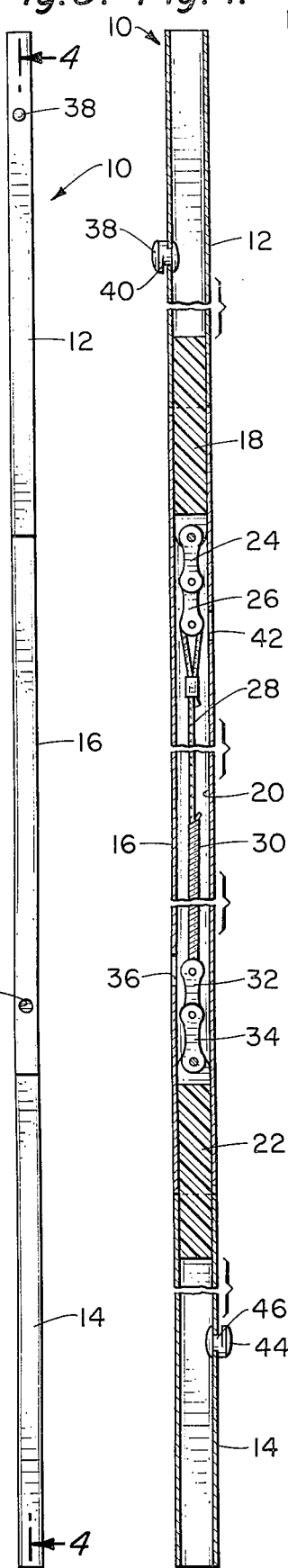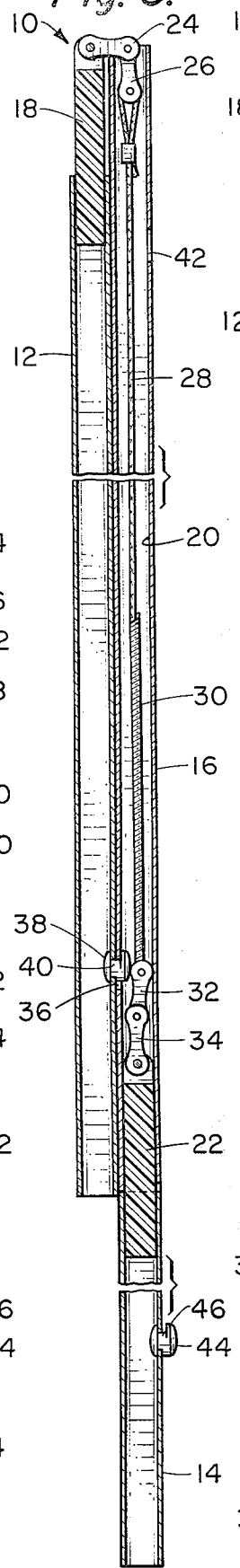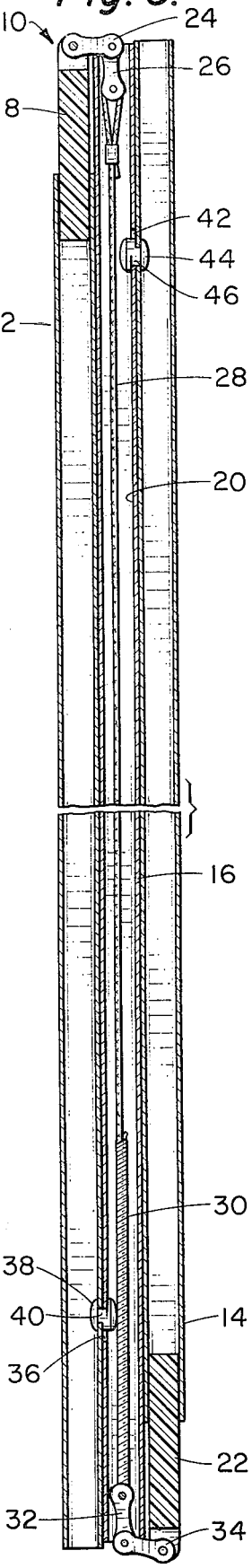

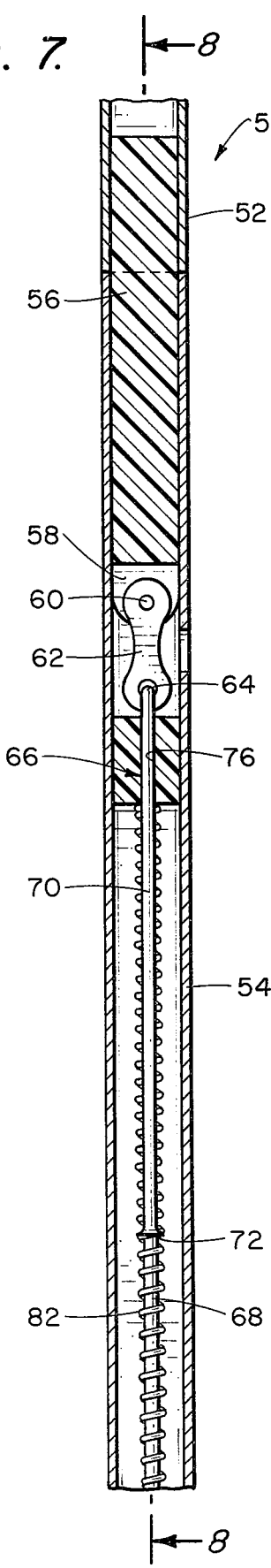
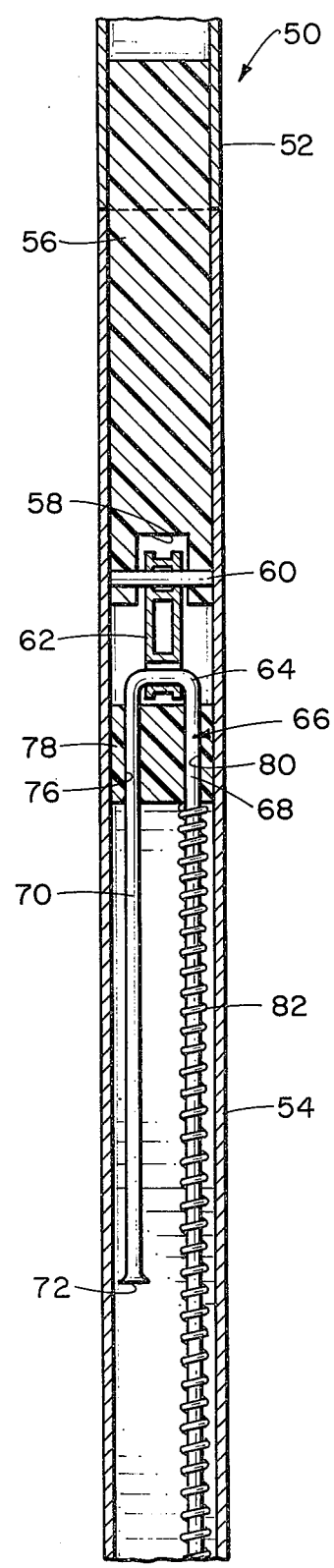
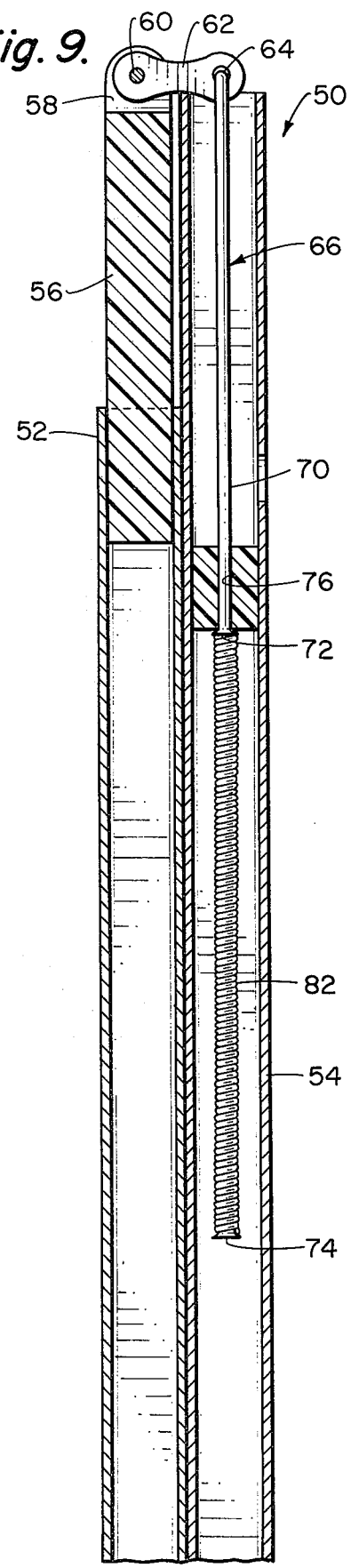

FOLDABLE MEASURING STICK

BACKGROUND OF THE INVENTION

The field of this invention relates to measuring sticks and more particularly to a foldable measuring stick which is formed of an extended length, six feet and longer, and usable in the construction industry to check grades in the constructing of dams, roads and hillsides.

In the construction industry, in the moving of dirt, telescope leveling instruments are in common use such as a transit. The leveling instrument is used in combination with an elongated measuring stick. The leveling instrument is mounted in a horizontal plane and then a person, usually referred to as a grade checker, is located at a location spaced from the instrument and holds an elongated measuring stick. This measuring stick has printed thereon a measure table such as inches and feet, or a metric table. The bottom of the stick is placed against the dirt grade and a person looking through the transit can visually observe the measure table thereby noting the particular measuring point on the table which coincides with the horizontal position of the transit. By using this information, the grade level can be determined.

The grade level measuring sticks are usually 6 feet long and frequently 8 feet long and at times it would be desirable to have such sticks to be of a longer length as at times a 30 foot measuring stick would be preferable.

Such extended length of measuring sticks does not facilitate portability. Such sticks are difficult to carry around on a person and are difficult to carry in an automobile. It is not uncommon for a grade checker to put such a stick on the ground, when not in use, and have the stick run over by a piece of construction equipment.

In order to overcome the disadvantage of a solid measuring stick, it has been common for grade checkers to use the common type of folding ruler. However, this ruler is usually formed of a thin sheet material, such as wood, and the ruler tends to bend during use which can give inaccurate readings. Also, such a ruler breaks easily and it takes a substantial amount of time in order to unfold the ruler and to collapse the ruler.

Grade checkers usually work around heavy construction equipment and this type of equipment frequently has a cab which is mounted several feet off the ground. A person walking around amongst this equipment, such as a grade checker, may not be readily seen by operators of this heavy equipment. However, if a flag, or some other type of visual identification means could be mounted on the top of the measuring stick, and the measuring stick was of an extended length, that such a device would act as a safety precaution against the grade checker being injured by the heavy equipment and that the grade checker would be more easily observed to the operators of the equipment. To place such a flag on on the foldable rule, which is now frequently employed, would not be convenient. Also, such foldable rules rarely exceed six feet in length and an eight foot length would be the minimum length needed to be observable by the operators of the heavy equipment.

Previously, there has been an attempt to design a collapsible measuring stick which employs a plurality of telescoping rods. However, this structure is quite complex and therefore costly to manufacture. Also, the time involved in moving the telescoping rods to the extended length is more than a few seconds. If one of the telescoping rods is not fully telescoped, the measuring stick can give inaccurate readings.

SUMMARY OF THE INVENTION

The basic structure of this invention is believed to be adequately described in the abstract of the disclosure and reference is to be had thereto.

The advantages of the structure of this invention is as follows: A foldable measuring stick which can be easily and quickly unfolded and folded. A foldable measuring stick that is rigid even at an extended length. A measuring stick constructed of a high strength metal material which will resist damage and wear. The measuring stick of this invention can be readily carried in a carrying case attached to the person.

BRIEF DESCRIPTION OF THE DRAWINGS

FIG. 1 is a front view of the first embodiment of measuring stick of this invention showing such in the extended position;

FIG. 2 is a side view of the first embodiment of this invention taken along line 2—2 of FIG. 1;

FIG. 3 is a back view of the first embodiment of this invention taken along line 3—3 of FIG. 2;

FIG. 4 is a cross-sectional view of the first embodiment of this invention taken along line 4—4 of FIG. 3;

FIG. 5 is a cross-sectional view similar to FIG. 4, but showing the first embodiment of this invention in a partially folded position;

FIG. 6 is a cross-sectional view showing the first embodiment of this invention in a completely folded position;

FIG. 7 is a cross-sectional view through a pair of connected in-line members forming the second embodiment of the measuring stick of this invention;

FIG. 8 is a cross-sectional view taken along line 8—8 of FIG. 7; and

FIG. 9 is a cross-sectional view similar to FIG. 7, but showing the members in an abutting side by side relationship.

DETAILED DESCRIPTION OF THE SHOWN EMBODIMENT

Referring particularly to the drawing, there is shown in FIG. 1 the first embodiment of measuring stick 10 of this invention which is composed basically of a first member 12, a second member 14 and and intermediate member 16. Each of the members 12, 14 and 16 are formed of the same cross-sectional shape and in this particular instance are in a square shape. However, any other polygonal shape could be employed, as well as a circular shape. Also, each of the members have a measuring table formed thereon such as is clearly shown in FIG. 2. The normal combined length of the measuring stick of this invention will normally be either 6 feet or 8 feet, however, it is envisioned that any other length could be employed. If greater lengths of measuring sticks are preferred, it would normally be required, for purposes of rigidity, that a larger cross-sectional size of measuring stick be employed, such as ¾ inch square. However, within the normal range of 6 foot to 8 foot measuring sticks, the cross-sectional size will only be ⅜ to ½ an inch square.

Each of the members 12, 14 and 16, are formed of a tubular stock material. Telescopingly mounted within one end of member 12 is a connecting block 18. This block 18 is fixedly mounted within the member 12 and extends exteriorly thereof. The block 18 is adapted to matingly cooperate within the interior chamber 20 formed within the intermediate member 16. With the block 18 located within the chamber 20, a rigid interconnection is established between member 12 and member 16. It is to be noted that each of the members 12, 14 and 16 are shown to be of substantially equal longitudinal length. However, it is to be considered within the scope of this invention to employ different lengths for each of the members if preferred.

A similar connecting block 22 is fixedly mounted within the second member 14 and extends exteriorly thereof. The connecting blocks 18 and 22 can be formed of any rigid material such as wood, plastic or the like.

Pivotally connected to the block 18 is a first link 24. A second link 26 is pivotally connected to the first link 24. The links 24 and 26 are similar to the links employed in a conventional bicycle chain. A cable 28 is attached to the free end of the second link 26. The cable 28 is also secured to a coil spring 30. The free-end of the coil spring 30 is attached to a third link 32 which, in turn, is pivotally connected to a fourth link 34. The fourth link 34 is pivotally connected to the block 22.

Formed through the back wall of the intermediate member 16 is a first aperture 36. Attached to the back wall of the first member 12 is a first pin 38. Pin 38 includes a lateral recess 40.

Formed within the front wall of the intermediate member 16 is a second aperture 42. Mounted upon the front wall of the second member 14 is a second pin 44. The pin 44 also includes a lateral recess 46.

The operation of the apparatus of this invention is as follows: Let it be assumed that the measuring stick 10 of this invention is in the fully extended position as shown in FIGS. 1 to 4. In this position, the stick 10 is to be used. In the extended position, the coil spring 30 is slightly extended so that a biasing force is exerted tending to maintain the interlocked engagement of members 12 and 14 with the intermediate member 16.

Now let it be assumed that it is desired to collapse the measuring stick 10 of this invention. The operator will grasp member 12 and also member 16 and exert a force therebetween tending to separate member 12 from member 16. As a result, the coil spring 30 is further extended. The separating movement is continued until block 18 is taken out of association from chamber 20. The operator then folds section 12 against the outer surface of section 16, this folding being permitted due to the interaction of links 24 and 26. With member 12 against member 16, the pin 38 is capable of cooperating within aperture 36. Because of the lateral recess 40, the side wall of the aperture 36 is located within the recess 40 and is tended to be maintained therein due to the biasing action of spring 30.

In a similar manner, the member 14 is grasped and separated from member 16 until block 22 is taken out of engagement with the chamber 20. The member 14 is then folded against the front side of the member 16, such folding action being permitted by links 32 and 34. In this position the pin 44 cooperates within the opening 42 with the side wall of the aperture 42 cooperating with the lateral recess 46. Again, the biasing action of the spring 30 tends to maintain engagement of the side wall of the aperture 42 in engagement with the recess 46. Therefore a secure locking structure is obtained between members 12 and 16 and members 14 and 16 resulting in the stick 10 of this invention assuming a completely integral unit when in the collapsed position.

In order to reverse the procedure and move the stick 10 of this invention from the collapsed position to the extended position, the operator only needs to exert a small force against the end of block 22 slightly moving member 14 with respect to member 16. This movement is to be sufficient so as to disengage the side wall of the aperture 42 from the lateral recess 46. The member 14 is then free to swing to a position of longitudinal alignment with the member 16 which will result in block 22 again cooperating with chamber 20. This procedure is repeated with respect to member 12 resulting in the measuring stick 10 of this invention assuming the extended position.

It is considered to be within the scope of this invention that instead of the locking pins 38 and 44 that a locking lip could be employed at the free ends of the members 12 and 14. Also, other types of locking arrangements could be employed without departing from the scope of this invention. It is also to be considered within the scope of this invention that instead of the spring 30 that other types of elastic means could be employed, such as an expansible cord (rubber embedded within the fibers of the cord). Also, any other type of elastic means could be employed.

Referring in particular to FIG. 7 and 9, the second embodiment 50 of measuring stick of this invention is shown. The second embodiment 50 operates in the same way as the first embodiment 10 and for the operation reference is to be had thereto. The primary advantage of the second embodiment 50 is that it only requires two members to effect the movement between the members wherein the first embodiment 10 requires a first member, a second member and an intermediate member.

The second embodiment 50 is composed of a first member 52 and a second member 54. The members 52 and 54 are formed of a tubular construction and basically similar to the members within the first embodiment. Member 52 has telescopingly mounted within one end thereof a connecting block 56. Connecting block 56 is bascially identical to the connecting blocks 18 and 22 of the first embodiment. The connecting block 56 includes a central recess 58 at its outermost end thereof. A pivot pin 60 extends across the recess 58 and is fixedly positioned within the block 56.

Pivotally connected to the pivot pin 60 is a link 62. The line 62 is basically identical to previously mentioned link 24 and 26.

The free end of link 62 is pivotally attached at the apex section 64 of a rod element 66. Rod element 66 is bifurcated forming a long leg 68 and a shortened leg 70. The short leg 70 terminates in a flaired section 72 with long leg 68 terminating in a flaired section 74. The short leg 70 passes through opening 76 formed within a stop block 78. Long leg 68 passes through opening 80 extending through stop block 78. The stop block 78 is fixedly mounted within second member 54.

The coil spring 82 is mounted upon the long leg 68 with the ends of the coil spring 82 being in contact with flaired end 74 and stop block 78.

The rod element 66 is movable with respect to the stop block 78 between a retracted position shown in FIG. 8 and an extended position shown in FIG. 9. The coil spring 82 functions to exert a continuous bias tending to maintain the element 66 in the retracted position. The length of the link 70 is selected so that with the flaired end 72 in contact with the stop block 78 the first member 52 can be pivoted to an abutting side by side relationship with the member 54. When in the retracted position, the spring 82 functions to maintain interconnection between the members 54 and 52 with the connecting block 56 located within the member 54.

By using the second embodiment 50 of this invention, a measuring stick can be made with three or more members using the second embodiment 50. When three or more members are employed, an interconnecting arrangement such as shown in FIGS. 7 to 9 is employed between any two adjacent members.

What is claimed is:

1. A foldable measuring device comprising:
   a pair of members, one of said members including a hollow chamber;
   connecting means for interlocking together said first and said second members when said members are in an abutting longitudinal alignment;
   first means connected to both said first and second members are located within said hollow chamber, with said members interlocked together said first means exerting a force tending to maintain said members in said interlocked relationship, said first means including elastic means to permit separating of said members and locating of such in an abutting side by side relationship; and
   a locking means interconnecting said members when said members are located in said abutting side by side relationship, said locking means to retain said members in said side by side position, said elastic means cooperating with said locking means to maintain the interconnected side by side position of said members.

2. A foldable measuring stick comprising:
   a pair of members, one of said members including a hollow chamber;
   connecting means for interlocking together said first and said second members when said members are in an abutting longitudinal alignment;
   first means connected to both said first and second members and located within said hollow chamber, with said members interlocked together said first means exerting a force tending to maintain said members in said interlocked relationship, said first means being elastic to permit separating of said members and locating of such in an abutting side by side relationship;
   a locking means interconnecting said members when said members are located in said abutting side by side relationship, said locking means to retain said members in said side by side position; and
   an aperture within one of said members, a pin attached to the other of said members, said pin including a lateral recess, with said members in said side by side relationship said pin being located within said aperture and said first means exerts a bias between said members causing a portion of the sidewall around said aperture to cooperate within said lateral recess thereby establishing a locked assembly between said members.

3. A foldable measuring device comprising:
   a first longitudinal member;
   a second longitudinal member;
   an intermediate longitudinal member, said intermediate longitudinal member having an interior hollow chamber;
   said first member being connectable in an abutting longitudinally in line relationship to said intermediate member, said second member being connectable in an abutting longitudinal in line relationship to said intermediate member;
   first means connected to both said first and said second members and located within said hollow chamber of said intermediate member, said first means including elastic means to permit separating of said first and said second members relative to said intermediate member to locate said first and said second members along side said intermediate member; and
   a first locking means and a second locking means, said first locking means to connect together said first member and said intermediate member when such are in said along side relationship, said second locking means to connect together said second member and said intermediate member when such are in said along side position, said elastic means cooperating with both said locking means to maintain the interconnected side by side position of said members.

4. A foldable measuring stick comprising:
   a first longitudinal member;
   a second longitudinal member;
   an intermediate longitudinal member, said intermediate longitudinal member having an interior hollow chamber;
   said first member being connectable in an abutting longitudinally in line relationship to said intermediate member, said second member being connectable in an abutting longitudinal in line relationship to said intermediate member;
   first means connected to both said first and said second members and located within said hollow chamber of said intermediate member, said first means being elastic to permit separating of said first and said second members relative to said intermediate member to locate said first and said second members along side said intermediate member;
   a first locking means and a second locking means, said first locking means to connect together said first member and said intermediate member when such are in said along side relationship, said second locking means to connect together said second member and said intermediate member when such are in said along side position; and
   an aperture within one of said members, a pin attached to the other of said members, said pin including a lateral recess, with said members in said side by side relationship said pin being located within said aperture and said first means exerts a bias between said members causing a portion of the sidewall around said aperture to cooperate within said lateral recess thereby establishing a locked assembly between said members.

* * * * *